United States Patent
Kim et al.

(10) Patent No.: US 11,838,560 B2
(45) Date of Patent: Dec. 5, 2023

(54) METHOD AND SYSTEM FOR PLAYING BACK STREAMING CONTENT USING LOCAL STREAMING SERVER

(71) Applicant: NAVER CORPORATION, Seongnam-si (KR)

(72) Inventors: SungHo Kim, Seongnam-si (KR); SungTaek Cho, Seongnam-si (KR); JaeChul Ahn, Seongnam-si (KR); Hyundong Hwang, Seongnam-si (KR); Byung Gyou Choi, Seongnam-si (KR); Jonghyeok Lee, Seongnam-si (KR); Songhyun Park, Seongnam-si (KR); Yongmaroo Kim, Seongnam-si (KR); Joon-kee Chang, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 148 days.

(21) Appl. No.: 17/653,326

(22) Filed: Mar. 3, 2022

(65) Prior Publication Data

US 2022/0191558 A1 Jun. 16, 2022

Related U.S. Application Data

(63) Continuation of application No. PCT/KR2020/011682, filed on Sep. 1, 2020.

(30) Foreign Application Priority Data

Sep. 4, 2019 (KR) .................. 10-2019-0109653

(51) Int. Cl.
*H04N 21/2225* (2011.01)
*H04L 65/612* (2022.01)
(Continued)

(52) U.S. Cl.
CPC ....... *H04N 21/2225* (2013.01); *H04L 65/612* (2022.05); *H04N 21/26258* (2013.01); *H04N 21/44* (2013.01)

(58) Field of Classification Search
CPC ......... H04N 21/2225; H04N 21/26258; H04N 21/44; H04N 21/235; H04N 21/6373;
(Continued)

(56) References Cited

U.S. PATENT DOCUMENTS

2013/0097309 A1 4/2013 Ma et al.
2017/0111665 A1 4/2017 Suryanarayanan et al.

FOREIGN PATENT DOCUMENTS

KR 101397183 B1 5/2014
KR 1020150008087 A 1/2015
(Continued)

OTHER PUBLICATIONS

Int'l. search report issued in PCT/KR2020/011682, dated Nov. 25, 2020.

*Primary Examiner* — Anthony Bantamoi
(74) *Attorney, Agent, or Firm* — Greer Burns & Crain Ltd.

(57) ABSTRACT

A method for playing back streaming content according to an embodiment may include a step in which a streaming player client sets an initial bitrate for a player module playing back streaming content; a step in which the streaming player client delivers, from the player module to a streaming server, a manifest file request for the streaming content; a step in which a local proxy server edits the manifest file delivered from the streaming server, the manifest file being edited on the basis of the set initial bitrate; and a step in which the local proxy server delivers the edited manifest file to the player module through the streaming player client.

11 Claims, 7 Drawing Sheets

(51) Int. Cl.
*H04N 21/262* (2011.01)
*H04N 21/44* (2011.01)

(58) Field of Classification Search
CPC ........... H04N 21/6581; H04N 21/8456; H04N 21/23439; H04N 21/47217; H04N 21/4331; H04N 21/47205; H04L 65/612; H04L 65/752; H04L 65/764; H04L 65/80; G11B 27/02
See application file for complete search history.

(56) References Cited

FOREIGN PATENT DOCUMENTS

| KR | 1020150119170 A | 10/2015 |
| KR | 1020170015912 A | 2/2017 |

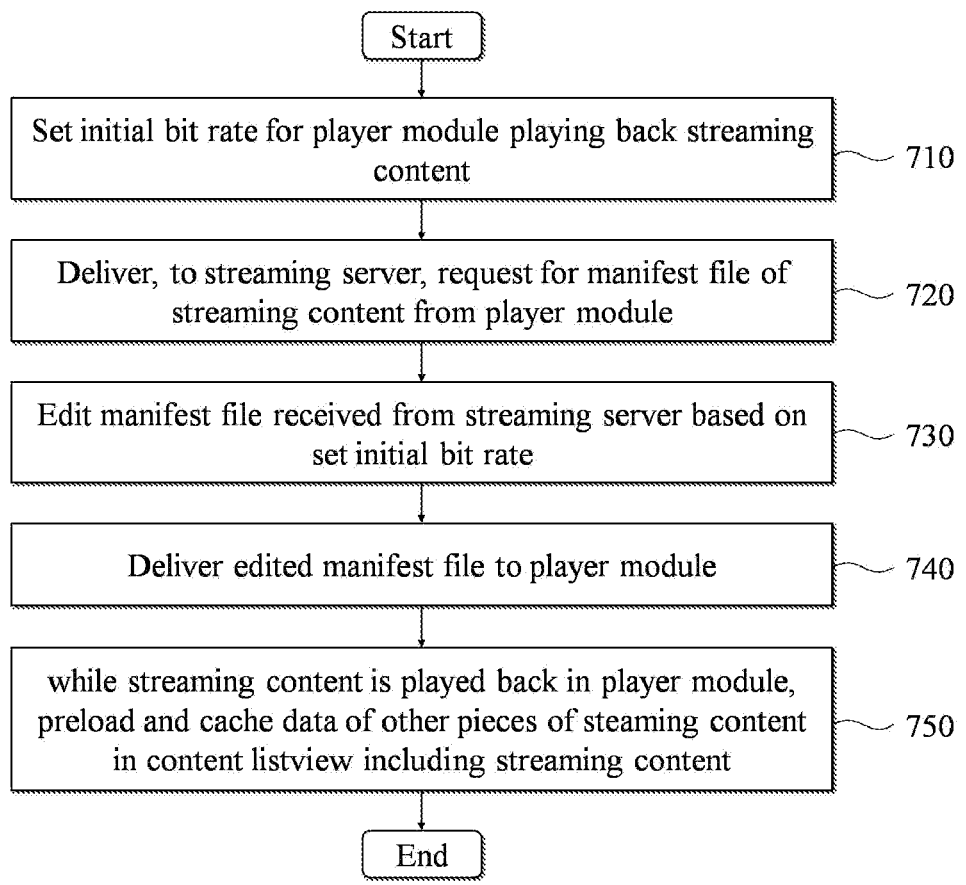

METHOD AND SYSTEM FOR PLAYING BACK STREAMING CONTENT USING LOCAL STREAMING SERVER

CROSS-REFERENCE TO RELATED APPLICATIONS

This is a continuation application of International Application No. PCT/KR2020/011682, filed Sep. 1, 2020, which claims the benefit of Korean Patent Application No. 10-2019-0109653, filed Sep. 4, 2019.

BACKGROUND OF THE INVENTION

Field of Invention

The following description of the present invention relates to a method and system for playing back streaming content using a local streaming server.

Description of Related Art

As existing solutions for playing back streaming content, there are, for example, HTTP live streaming (HLS), moving picture experts group-dynamic adaptive streaming over HTTP (MPEG-DASH), mp4, etc. Korean Patent No. 10-1397183 discloses a method and apparatus for managing a playback list file in a streaming service.

In such existing solutions, one video file may be previously prepared with every track having different bit rates. A client may select a track having a required bit rate, and may be provided with streaming content from a server at the corresponding bit rate. However, there is a problem in that at first the client simply selects a track (the first track, track #0) recorded at the top of a manifest file because the client is unaware of its own bit rate and has to select an adaptive track again in next invoking for requesting a next fragments file. For example, in the case of HLS, a client selects the first track registered with master.m3u8, that is, a manifest file, and requests a 0-th fragment file (0.ts). However, to select the adaptive track, an algorithm by which a client directly selects a new track by taking a network bandwidth, the amount of buffer remaining, a screen size, etc. operates. In next invoking for requesting the next fragments file, the probability that a new track will be selected is high. If the new track is selected, the client discards the 0-th fragment file (0.ts) downloaded as the first track and newly downloads the 0-th fragment file (0.ts) of the new track. Accordingly, in this process, one request for track information and one request for the 0-th fragment file (0.ts) are wasted.

Furthermore, the existing solutions have a problem in that a cache and preloading for a video fragment file are not present. For example, a cache policy is not present in a content listview, that is, a list of multiple pieces of streaming content. Accordingly, when one of multiple pieces of streaming content is focused in the content listview, data waste and a loss of an execution speed occur because the focused streaming content is newly downloaded from a 0-th fragment file (0.ts).

BRIEF SUMMARY OF THE INVENTION

There are provided a method and a system for playing back streaming content, which can solve a problem in that an adaptive track has to be selected again by setting an initial bit rate between a player module and a streaming player client and enabling a track optimized for the initial bit rate to be selected as the first track by using a local streaming server (e.g., a local proxy server) in streaming services, such as HTTP live streaming (HLS), moving picture experts group-dynamic adaptive streaming over HTTP (MPEG-DASH), and MPEG-4 (mp4).

There are provided a method and a system for playing back streaming content, which can increase the hitting probability of cached data by determining a caching order of another piece of streaming content based on the arrangement of streaming content in a content listview. currently being focused and played back among multiple pieces of streaming content included in the content listview, by using the local streaming server.

There is provided a computer program stored in a computer-readable recording medium in order to execute a method of playing back streaming content in a computer device in combination with the computer device. The method of playing back streaming content includes setting, by a streaming player client, an initial bit rate for a player module which plays back streaming content, delivering, by the streaming player client, a request for a manifest file of the streaming content from the player module to a streaming server, editing, by a local proxy server, the manifest file delivered from the streaming server based on the set initial bit rate, and delivering, by the local proxy server, the edited manifest file to the player module through the streaming player client.

According to an aspect, the editing may include selecting one track among tracks recorded on the manifest file based on the set initial bit rate, and editing the manifest file so that the selected track is recorded as the first track of the manifest file.

According to another aspect, as the player module selects the first track in the edited manifest file, the selected track may be selected based on the set initial bit rate.

According to still another aspect, the method of playing back streaming content may further include delivering, by the streaming player client, a request for track information of the track selected in the edited manifest file from the player module to the streaming server, and delivering, by the streaming player client, the track information delivered from the streaming server to the player module.

According to still another aspect, the method of playing back streaming content may further include preloading and caching, by the local proxy server, data of other pieces of streaming content in a content listview including the streaming content, while the streaming content is played back in the player module.

According to still another aspect, the preloading and caching may include determining at least one of a preloading order and caching order of each of the other pieces of streaming content, based on a relative distance between a location where the streaming content is disposed and a location where each of the other pieces of streaming content is disposed in the content listview.

There is provided a method of playing back, by a computer device, streaming content including at least one processor, including setting, by the at least one processor, an initial bit rate for a player module which plays back streaming content, delivering, by the at least one processor, a request for a manifest file of the streaming content from the player module to a streaming server, editing, by the at least one processor, the manifest file delivered from the streaming server based on the set initial bit rate, and delivering, by the at least one processor, the edited manifest file to the player module.

There is provided a computer-readable recording medium on which a computer program for executing the method in a computer device has been recorded.

There is provided a computer device including at least one processor implemented to execute an instruction readable by a computer. The at least one processor sets an initial bit rate for a player module which plays back streaming content, delivers a request for a manifest file of the streaming content from the player module to a streaming server, edits the manifest file delivered from the streaming server based on the set initial bit rate, and delivers the edited manifest file to the player module.

A problem in that an adaptive track has to be selected again can be solved by setting an initial bit rate between a player module and a streaming player client and enabling a track optimized for the initial bit rate to be selected as the first track by using a local streaming server (e.g., a local proxy server) in streaming services, such as HTTP live streaming (HLS), moving picture experts group-dynamic adaptive streaming over HTTP (MPEG-DASH), and MPEG-4 (mp4).

The hitting probability of cached data can be increased by determining the caching order of another piece of streaming content based on the arrangement of streaming content in a content listview, currently being focused and played back among multiple pieces of streaming content included in the content listview, by using the local streaming server.

BRIEF DESCRIPTION OF THE DRAWINGS

FIG. 7 is a flowchart illustrating an example of a method of playing back, by a client, streaming content according to an embodiment of the present disclosure.

DETAILED DESCRIPTION OF THE INVENTION

Hereinafter, embodiments are described in detail with reference to the accompanying drawings.

A system for playing back streaming content according to embodiments of the present disclosure may be implemented by at least one computer device. A method of playing back streaming content according to embodiments of the present disclosure may be performed through at least one computer device included in the system for playing back streaming content. In this case, a computer program according to an embodiment of the present disclosure may be installed and driven in the computer device. The computer device may perform the method of playing back streaming content according to embodiments of the present disclosure under the control of the driven computer program. The computer program may be stored in a computer-readable recording medium in order to execute the method of playing back streaming content in a computer in combination with the computer device.

Figure 1:
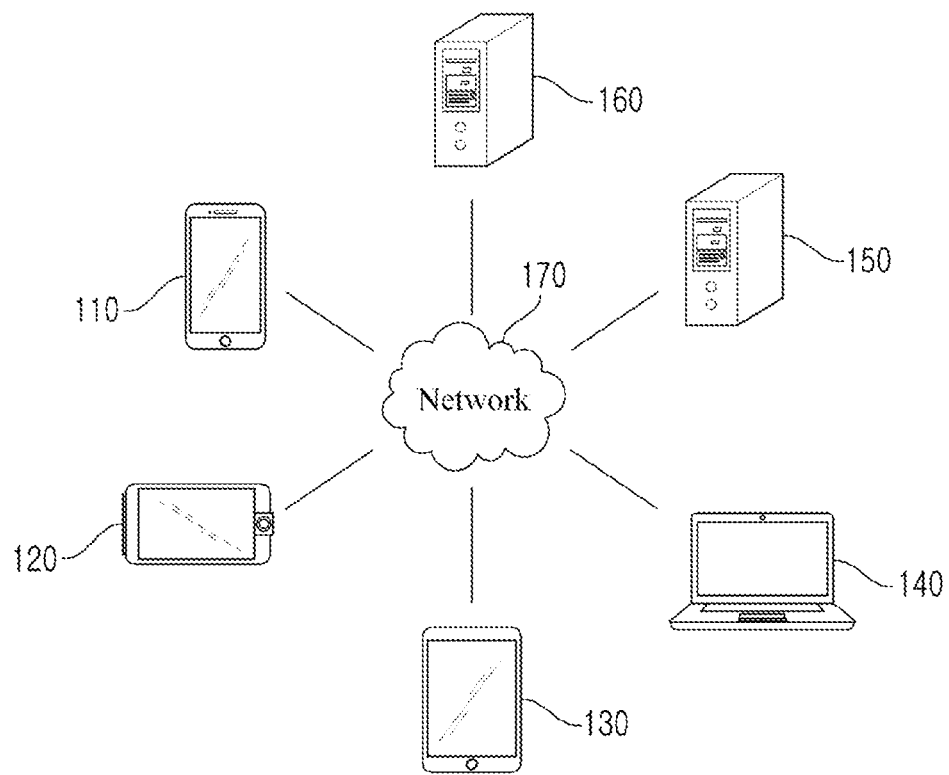
FIG. 1 is a diagram illustrating an example of a network environment according to an embodiment of the present disclosure.

FIG. 1 is a diagram illustrating an example of a network environment according to an embodiment of the present disclosure. The network environment of FIG. 1 illustrates an example including a plurality of electronic devices 110, 120, 130, and 140, a plurality of servers 150 and 160, and a network 170. FIG. 1 is an example for describing the present disclosure, and the number of electronic devices or the number of servers is not limited to that of FIG. 1. Furthermore, the network environment of FIG. 1 merely describes one of environments applicable to the present embodiments, and an environment applicable to the present embodiments is not limited to the network environment of FIG. 1.

Each of the plurality of electronic devices 110, 120, 130 and 140 may be a stationary terminal or a mobile terminal implemented as a computer device. For example, the plurality of electronic devices 110, 120, 130 and 140 may include a smartphone, a mobile phone, a navigation device, a computer, a laptop computer, a device for digital broadcasting, a personal digital assistant (PDA), a portable multimedia player (PMP), a tablet PC, etc. For example, in FIG. 1, a shape of a smartphone is illustrated as being an example of the electronic device 110. However, in embodiments of the present disclosure, the electronic device 110 may mean one of various physical computer devices capable of communicating with other electronic devices 120, 130 and 140 and/or the servers 150 and 160 over the network 170 substantially using a wireless or wired communication method.

The communication method is not limited, and may include short-distance wireless communication between devices in addition to communication methods using communication networks (e.g., a mobile communication network, wired Internet, wireless Internet, and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer device or a plurality of computer devices, which provides an instruction, a code, a file, content, or a service through communication with the plurality of electronic devices 110, 120, 130 and 140 over the network 170. For example, the server 150 may be a system that provides the plurality of electronic devices 110, 120, 130, and 140 with services (e.g., a group communication service (or a voice conference service), a messaging service, a mail service, a social network service, a translation service, a finance service, a payment service, a search service and a content provision service).

Figure 2:
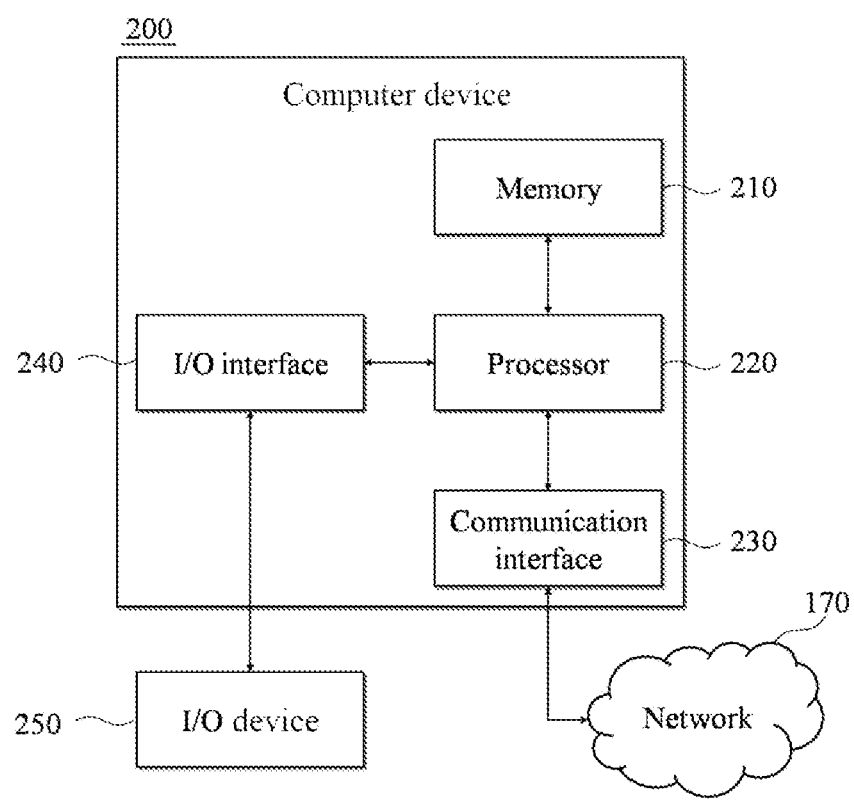
FIG. 2 is a block diagram illustrating an example of a computer device according to an embodiment of the present disclosure.

FIG. 2 is a block diagram illustrating an example of a computer device according to an embodiment of the present disclosure. Each of the plurality of electronic devices 110, 120, 130 and 140 or each of the servers 150 and 160 may be implemented as a computer device 200 illustrated in FIG. 2.

As illustrated in FIG. 2, the computer device 200 may include a memory 210, a processor 220, a communication interface 230 and an input/output (I/O) interface 240. The memory 210 is a computer-readable medium, and may include permanent mass storage devices, such as a random access memory (RAM), a read only memory (ROM) and a disk drive. In this case, the permanent mass storage device, such as a ROM and a disk drive, may be included in the computer device 200 as a permanent storage device separated from the memory 210. Furthermore, an operating system and at least one program code may be stored in the memory 210. Such software components may be loaded from a computer-readable medium, separated from the memory 210, to the memory 210. Such a separate computer-readable medium may include computer-readable recording media, such as a floppy drive, a disk, a tape, a DVD/CD-ROM drive, and a memory card. In another embodiment, software components may be loaded onto the memory 210 through the communication interface 230 not a computer-readable medium. For example, the software components may be loaded onto the memory 210 of the computer device 200 based on a computer program installed by files received over the network 170.

The processor 220 may be configured to process instructions of a computer program by performing basic arithmetic, logic and input/output (I/O) operations. The instructions may be provided to the processor 220 by the memory 210 or the communication interface 230. For example, the processor 220 may be configured to execute received instructions based on a program code stored in a recording device, such as the memory 210.

The communication interface 230 may provide a function for enabling the computer device 200 to communicate with other devices (e.g., the aforementioned storage devices) over the network 170. For example, a request, a command, data or a file generated by the processor 220 of the computer device 200 based on a program code stored in a recording device, such as the memory 210, may be provided to other devices over the network 170 under the control of the communication interface 230. Inversely, a signal, a command, data or a file from another device may be received by the computer device 200 through the communication interface 230 of the computer device 200 over the network 170. A signal, a command or a file received through the communication interface 230 may be transmitted to the processor 220 or the memory 210. A file received through the communication interface 230 may be stored in a storage device (e.g., the aforementioned permanent storage device) which may be further included in the computer device 200.

The I/O interface 240 may be means for interfacing with an I/O device 250. For example, an input device in the I/O device 250 may include a device, such as a microphone, a keyboard, or a mouse. An output device in the I/O device 250 may include a device, such as a display or a speaker. For another example, the I/O interface 240 may be means for interfacing with a device in which functions for input and output have been integrated into one, such as a touch screen. At least one of the I/O devices 250, together with the computer device 200, may be configured as a single device.

Furthermore, in other embodiments, the computer device 200 may include greater or smaller number of components than the components of FIG. 2. For example, the computer device 200 may be implemented to include at least some of the I/O devices 250 or may further include other components, such as a transceiver and a database.

Figure 3:
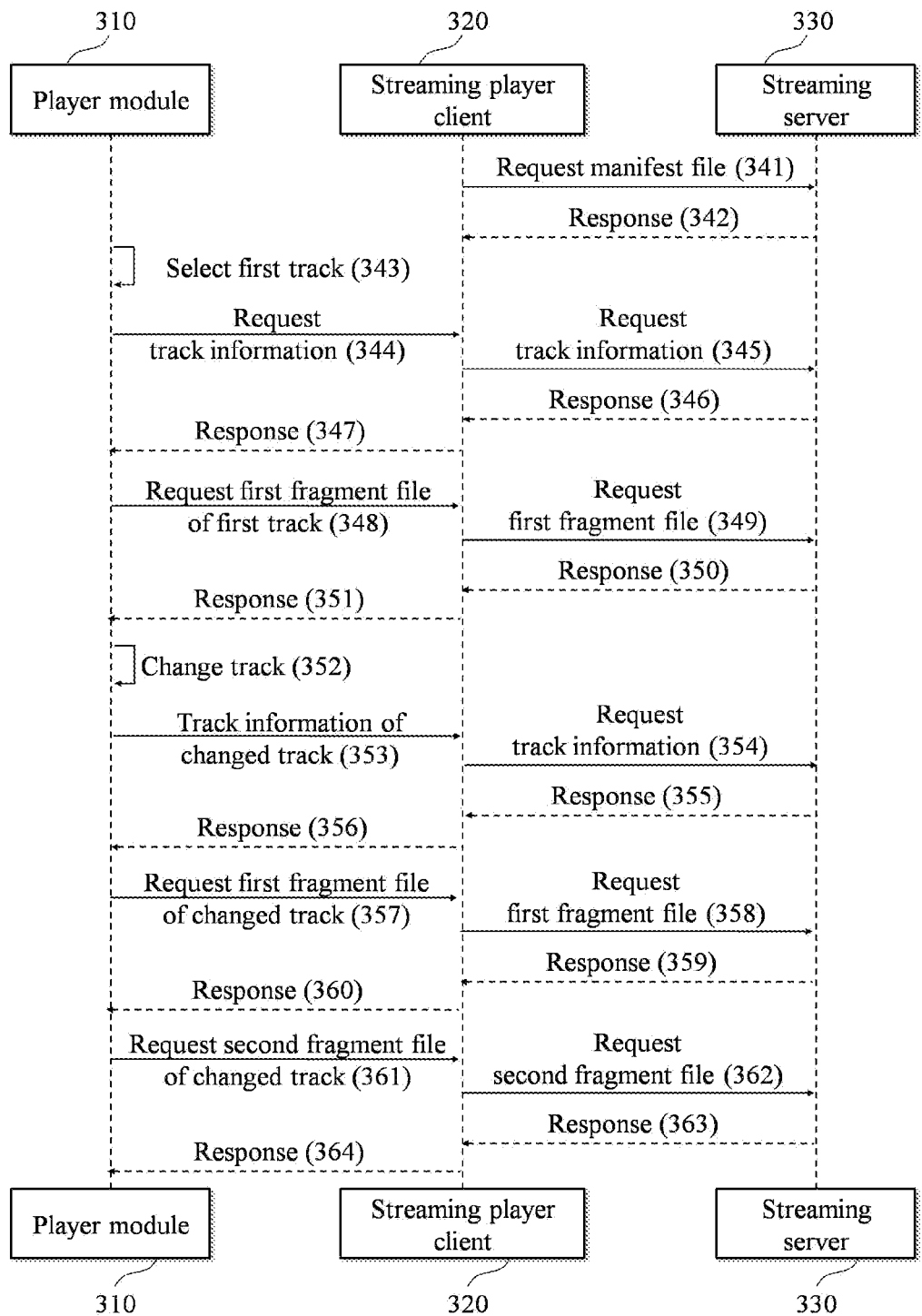
FIG. 3 is a flow diagram illustrating an example of a basic operation of an existing streaming service.

FIG. 3 is a diagram illustrating an example of a basic operation of an existing streaming service. FIG. 3 illustrates a player module 310, a streaming player client 320 and a streaming server 330. In this case, the player module 310 may be a software module installed and driven in a terminal device of a user for the playback of streaming content. The streaming player client 320 may be a software module installed and driven in the terminal device of a user in order to be provided with a streaming service. Furthermore, the streaming server 330 may correspond to a software module installed and driven in a server device that provides a streaming service.

A first process 341 may be an example of a process of requesting, by the streaming player client 320, a manifest file (e.g., master.m3u8 of HLS) from the streaming server 330. A second process 341 may be an example of a process of responding to, by the streaming server 330, the request from the streaming player client 320. For example, in the second process 342, the streaming server 330 may provide the manifest file to the streaming player client 320.

A third process 343 may be an example of a process of selecting, by the player module 310, the first track (track #0). As already described, one video file may be previously prepared as tracks having different bit rates. The player module 310 may select a track having a required bit rate. However, since the player module 310 cannot be aware of its own bit rate at first, the player module 310 simply selects the first track recorded at the top of the manifest file as in the third process 343.

A fourth process 344 may be an example of a process of requesting, by the player module 310, track information (e.g., playlist.m3u8 of track #0 of HLS) of the selected track (track #0) from the streaming player client 320. A fifth process 345 may be an example of a process of delivering, by the streaming player client 320, the request of the player module 310 to the streaming server 330. Furthermore, a sixth process 346 may be an example of a process of responding to, by the streaming server 330, the request of the streaming player client 320. A seventh process 347 may be an example of a process of responding to, by the streaming player client 320, the request of the player module 310. For example, the track information of the selected track requested by the player module 310 may be delivered to the player module 310 through the sixth process 346 and the seventh process 347.

An eighth process 348 may be an example of a process of requesting, by the player module 310, the first fragment file (e.g., 0.ts of track #0 of HLS) of the selected track (track #0) from the streaming player client 320. A ninth process 349 may be an example of a process of delivering, by the streaming player client 320, the request of the player module 310 to the streaming server 330. Furthermore, a tenth process 350 may be an example of a process of responding to, by the streaming server 330, the request of the streaming player client 320. An eleventh process 351 may be an example of a process of responding to, by the streaming player client 320, the request of the player module 310. For example, the first fragment file of the selected track requested by the player module 310 may be delivered to the player module 310 through the tenth process 350 and the eleventh process 351.

A twelfth process 352 may be an example of a process of finding, by the player module 310, an optimal bit rate by measuring a network bit rate through the received first fragment file and changing the track into a track (e.g., track #n) suitable for the optimal bit rate.

A thirteenth process 353 may be an example of a process of requesting, by the player module 310, track information (e.g., playlist.m3u8 of track #n of HLS) of the changed track (track #n) from the streaming player client 320. A fourteenth process 354 may be an example of a process of delivering, by the streaming player client 320, the request of the player module 310 to the streaming server 330. Furthermore, a fifteenth process 355 may be an example of a process of responding to, by the streaming server 330, the request of the streaming player client 320. A sixteenth process 356 may be an example of a process of responding to, by the streaming player client 320, the request of the player module 310. For example, track information of the changed track requested by the player module 310 may be delivered to the player module 310 through the fifteenth process 355 and the sixteenth process 356.

A seventeenth process 357 may be an example of a process of requesting, by the player module 310, the first fragment file (e.g., 0.ts of track #n of HLS) of the changed track (track #n) from the streaming player client 320. An eighteenth process 358 may be an example of a process of delivering, by the streaming player client 320, the request of the player module 310 to the streaming server 330. Furthermore, a nineteenth process 359 may be an example of a process of responding to, by the streaming server 330, the request of the streaming player client 320. A twentieth process 360 may be an example of a process of responding to, by the streaming player client 320, the request of the player module 310. For example, the first fragment file of the changed track requested by the player module 310 may be delivered to the player module 310 through the nineteenth process 359 and the twentieth process 360. In other words, the player module 310 may obtain the first fragment file capable of playing back focused streaming content only in the twentieth process 360.

Thereafter, a twenty-first process 361 to a twenty-fourth process 364 illustrate examples of processes for obtaining, by the player module 310, the second fragment file (e.g., 1.ts of track #n of HLS) of the changed track (track #n). Subsequent fragment files may also be obtained in a way similar to the twenty-first process 361 to the twenty-fourth process 364.

Figure 4:
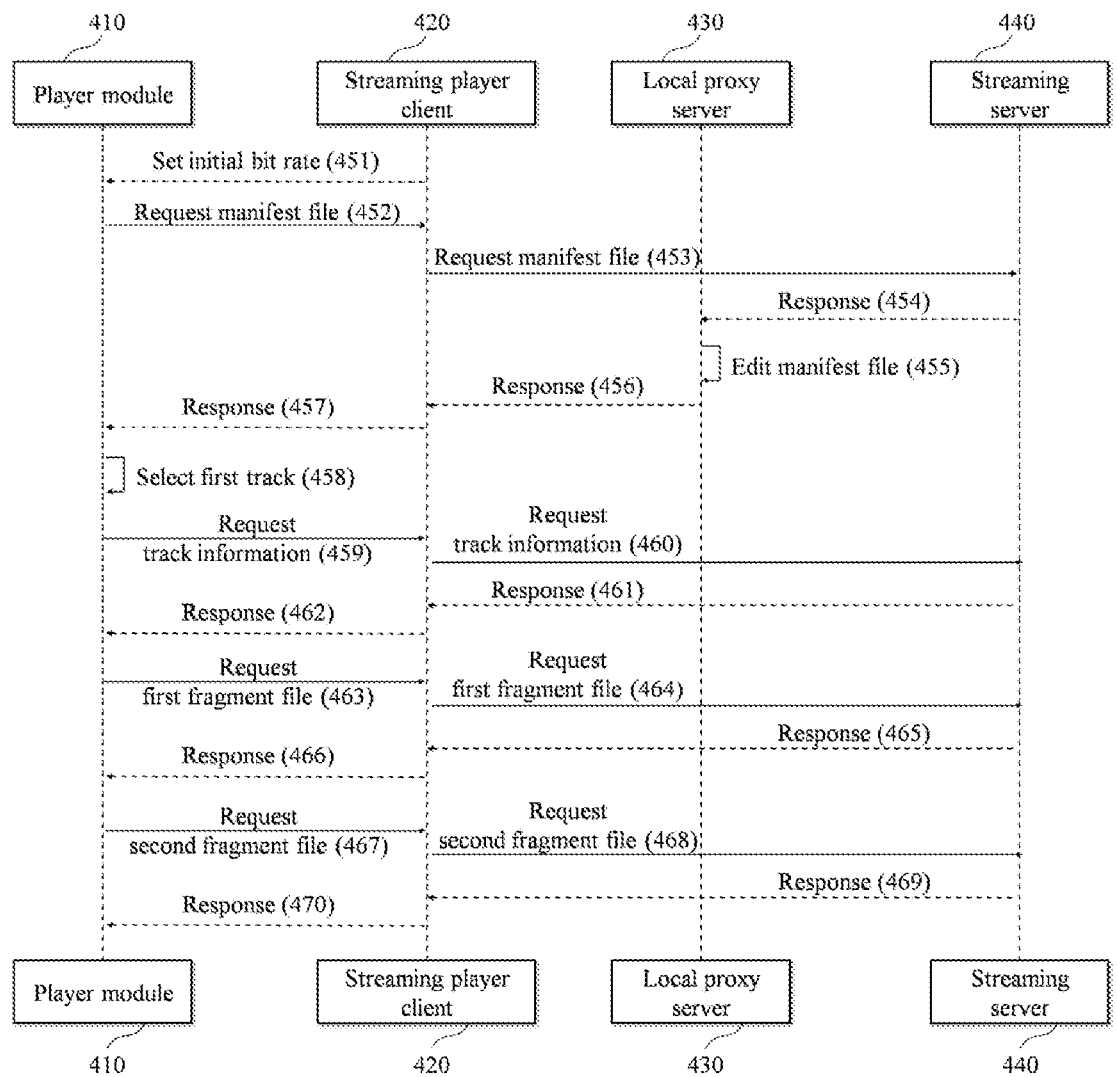
FIG. 4 is a flow diagram illustrating an example of a basic operation of a streaming service to which an optimized track selection method according to an embodiment of the present disclosure has been applied.

FIG. 4 is a diagram illustrating an example of a basic operation of a streaming service to which an optimized track selection method according to an embodiment of the present disclosure has been applied. FIG. 4 illustrates a player module 410, a streaming player client 420, a local proxy server 430 and a streaming server 450. In this case, the player module 410 may be a software module installed and driven in a terminal device (i.e., the electronic device 110, 120, 130 or 140) of a user for the playback of streaming content. Each of the streaming player client 420 and the local proxy server 430 may be a software module installed and driven in the same terminal device of a user in which the player module 410 is installed in order to be provided with a streaming service. Furthermore, the streaming server 440 may be a software module installed and driven in a server device (i.e., server 150 or 160) in order to provide a streaming service. In this case, the software module may correspond to a computer program installed and driven in the computer device 200.

A first process 451 may be an example of a process of setting, by the streaming player client 420, an initial bit rate in the player module 410. For example, the streaming player client 420 may set the initial bit rate for the player module 410 by considering a network bandwidth, the amount of buffer remaining, a screen size, etc. In a screen on which the list of content is displayed in terms of services, a low bit rate is required in order to rapidly download a frame buffer and play back a preview of pieces of content, and simultaneously a high bit rate is required in order to render a sharp image due to large resolution. Accordingly, a proper initial bit rate that is not too high and too low needs to be selected. An initial bit rate in such a service may be empirically preset. For example, in a content list screen for a mobile device such as the smart phone 110, it was checked that a track having 360p resolution is proper. Accordingly, although a bit rate for each resolution is slightly different depending on the complexity of an original video, an initial bit rate for a content list screen for a mobile device may be empirically preset by using the initial bit rate of about 750 kbps. In this case, the streaming player client 420 may set a preset initial bit rate in the player module 410.

A second process 452 may be an example of a process of requesting, by the player module 410, a manifest file (e.g., master.m3u8 of HLS) from the streaming player client 420. A third process 453 may be an example of a process of requesting, by the streaming player client 420, the manifest file from the streaming server 440.

A fourth process 454 may be an example of a process of delivering, by the streaming server 440, the requested manifest file. The streaming server 440 may transmit the requested manifest file to the streaming player client 420 that has requested the manifest file from the streaming server 440, but the local proxy server 430, that is, a local streaming server, may intercept such a manifest file. A fifth process 455 may be an example of a process of editing, by the local proxy server 430, the manifest file by using the initial bit rate set in the first process 451. For example, the local proxy server 430 may select the most proper track (e.g., track #n) by comparing the set initial bit rate with the tracks recorded on the manifest file. Thereafter, the local proxy server 430 may edit the manifest file (track #n→track #0) so that the selected track becomes the first track of the manifest file. A sixth process 456 may be an example of a process of delivering, by the local proxy server 430, the edited manifest file to the streaming player client 420. A seventh process 457 may be an example of a process of delivering, by the streaming player client 420, the edited manifest file to the player module 410.

Table 1 below illustrates an example of the first manifest file, and Table 2 illustrates an example of the edited manifest file.

TABLE 1

EXTM3U
EXT-X-VERSION:3
EXT-X-STREAM-INF:BANDWIDTH=3890176,RESOLUTION=1920x108055e26ca8-
3cb5-11e9-a5ac-246e963a49b9.m3u8
EXT-X-STREAM-INF:BANDWIDTH=2197504,RESOLUTION=1280x720446f42fd-
3cb5-11e9-9610-246e96398ca5.m3u8
EXT-X-STREAM-INF:BANDWIDTH=1199104,RESOLUTION=854x4801a37eb4f-
3cb5-11e9-a5ac-246e963a49b9.m3u8
EXT-X-STREAM-INF:BANDWIDTH=825344,RESOLUTION=640x360ce7d043b-3cb4-
11e9-9610-246e96398ca5.m3u8

TABLE 1-continued

```
#EXT-X-STREAM-INF:BANDWIDTH=494592,RESOLUTION=480x270
#EXT-X-STREAM-INF:BANDWIDTH=145408,RESOLUTION=256x144cfd62ada-3cb4-
11e9-8380-246e963a41ed.m3u8
```

TABLE 2

```
#EXTM3U
EXT-X-VERSION:3
#EXT-X-STREAM-INF:BANDWIDTH=1199104,RESOLUTION=854x4801a37eb4f-
3cb5-11e9-a5ac-246e963a49b9.m3u8
#EXT-X-STREAM-INF:BANDWIDTH=3890176,RESOLUTION=1920x108055e26ca8-
3cb5-11e9-a5ac-246e963a49b9.m3u8
EXT-X-STREAM-INF:BANDWIDTH=2197504,RESOLUTION=1280x720446f42fd-
3cb5-11e9-9610-246e96398ca5.m3u8
#EXT-X-STREAM-INF:BANDWIDTH=825344,RESOLUTION=640x360ce7d043b-3cb4-
11e9-9610-246e96398ca5.m3u8
#EXT-X-STREAM-INF:BANDWIDTH=494592,RESOLUTION=480x270#EXT-X-
STREAM-INF:BANDWIDTH=145408,RESOLUTION=256x144cfd62ada-3cb4-11e9-
8380-246e963a41ed.m3u8
```

Table 2 illustrates an example in which a third track (1a37eb4f-3cb5-11e9-a5ac-246e963a49b9.m3u8) illustrated in Table 1 has been edited as the first track. An eighth process 458 may be an example of a process of selecting, by the player module 410, the first track in the manifest file. As already described, since the first track (track #0) of the manifest file has been changed into the track most suitable for the set initial bit rate, the player module 410 selects, as the first track (track #0), the track most suitable for the initial bit rate set in the first process 451.

A ninth process 459 may be an example of a process of requesting, by the player module 410, track information (e.g., playlist.m3u8 of track #0 of HLS) of the selected track (track #0) from the streaming player client 420. A tenth process 460 may be an example of a process of requesting, by the streaming player client 420, the track information of the selected track from the streaming server 440. Furthermore, an eleventh process 461 may be an example of a process of delivering, by the streaming server 440, the requested track information to the streaming player client 420. A twelfth process 462 may be an example of a process of delivering, by the streaming player client 420, the requested track information to the player module 410.

A thirteenth process 463 may be an example of a process of requesting, by the player module 410, the first fragment file (e.g., 0.ts of track #0 of HLS) of the corresponding track (track #0) from the streaming player client 420. A fourteenth process 464 may be an example of a process of requesting, by the streaming player client 420, the first fragment file of the corresponding track from the streaming server 440. Furthermore, a fifteenth process 465 may be an example of a process of delivering, by the streaming server 440, the requested first fragment file to the streaming player client 420. A sixteenth process 466 may be an example of a process of delivering, by the streaming player client 420, the requested first fragment file to the player module 410. In this case, since the player module 410 has obtained the first fragment file of the track suitable for the set initial bit rate, the probability that the player module 410 will change the track again is low. If the track is not changed again, the player module 410 may play back focused streaming content through the current first fragment file. In other words, one request for track information and one request for the first fragment file which are included in a conventional process can be removed. Accordingly, the first playback timing of focused streaming content can be reduced.

Thereafter, a seventeenth process 467 to a twentieth process 470 illustrate examples of processes for obtaining, by the player module 410, the second fragment file (e.g., 1.ts of track #0 of HLS) of the first track (track #0). Subsequent fragment files may also be obtained in a way similar to the seventeenth process 467 to the twentieth process 470.

Figure 5:
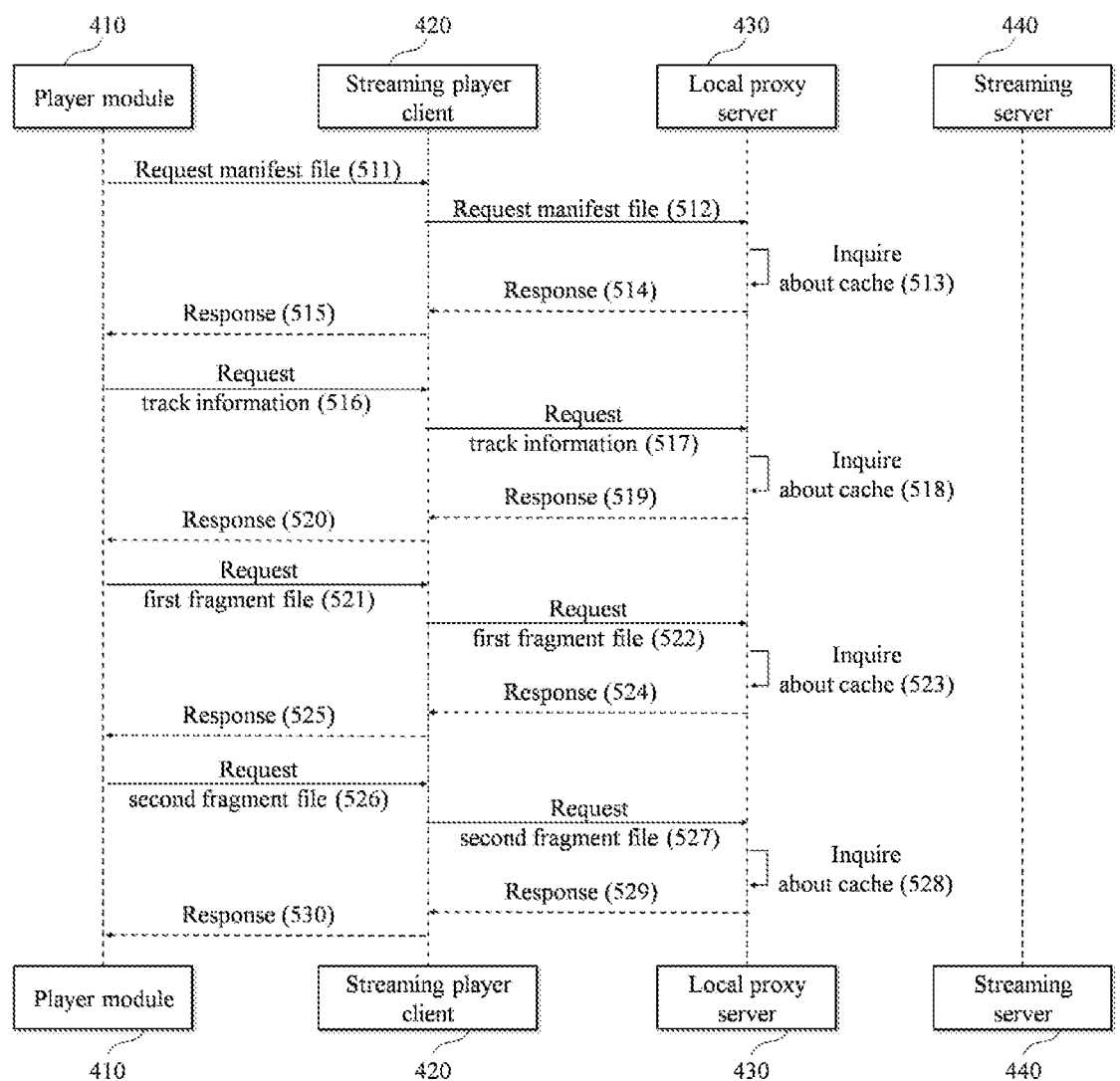
FIG. 5 is a flow diagram illustrating an example of a basic operation of a streaming service to which a caching and preloading method according to an embodiment of the present disclosure has been applied.

FIG. 5 is a diagram illustrating an example of a basic operation of a streaming service to which a caching and preloading method according to an embodiment of the present disclosure has been applied. The optimized track selection method described with reference to FIG. 4 and the caching and preloading method described with reference to FIG. 5 may be individually applied, but may be applied together. FIG. 5 describes an embodiment if the caching and preloading method has been individually applied.

A first process 511 may be an example of a process of requesting, by the player module 410, a manifest file (e.g., master.m3u8 of HLS) from the streaming player client 420. A second process 512 may be an example of a process of requesting, by the streaming player client 420, the manifest file from the local proxy server 430. In this case, a third process 513 may be an example of a process of inquiring about a cache by the local proxy server 430. In this case, if the requested manifest file is not stored in the cache, the local proxy server 430 may obtain the requested manifest file through the streaming server 440. However, if the requested manifest file is stored in the cache, the local proxy server 430 may provide the manifest file stored in the cache. A fourth process 514 may be an example of a process of delivering, by the local proxy server 430, the requested manifest file to the streaming player client 420. A fifth process 515 may be an example of a process of delivering, by the streaming player client 420, the manifest file to the player module 410.

As described above, the local proxy server 430 processes the preloading and caching of data in addition to track optimization in which the first track of a manifest file is changed into a track suitable for a preset initial bit rate as described with reference to FIG. 4, thereby being capable of improving an initial playback speed of streaming content.

Thereafter, a sixth process 516 to a tenth process 520 illustrate examples of processes for obtaining, by the player module 410, track information (e.g., playlist.m3u8 of HLS). An eleventh process 521 to a fifteenth process 525 illustrate examples of processes for obtaining, by the player module 410, the first fragment file (e.g., 0.ts of HLS). A sixteenth process 526 to a twentieth process 530 illustrate examples of processes for obtaining, by the player module 410, the second fragment file (e.g., 1.ts of HLS).

In this case, in order to increase the hitting probability for data within the cache, the local proxy server 430 may preload and cache data in order from streaming content disposed at a location relatively closer to first streaming content in a content listview to streaming content disposed at a location relatively distant from the first streaming content, based on the first streaming content now being focused and played back in the content listview. Since there is a good possibility that a user will again focus on streaming content surrounding the first streaming content that is currently being focused and played back in the content listview, the hitting probability for data within the cache can be increased through the preloading and caching of data according to the aforementioned order.

Figure 6:
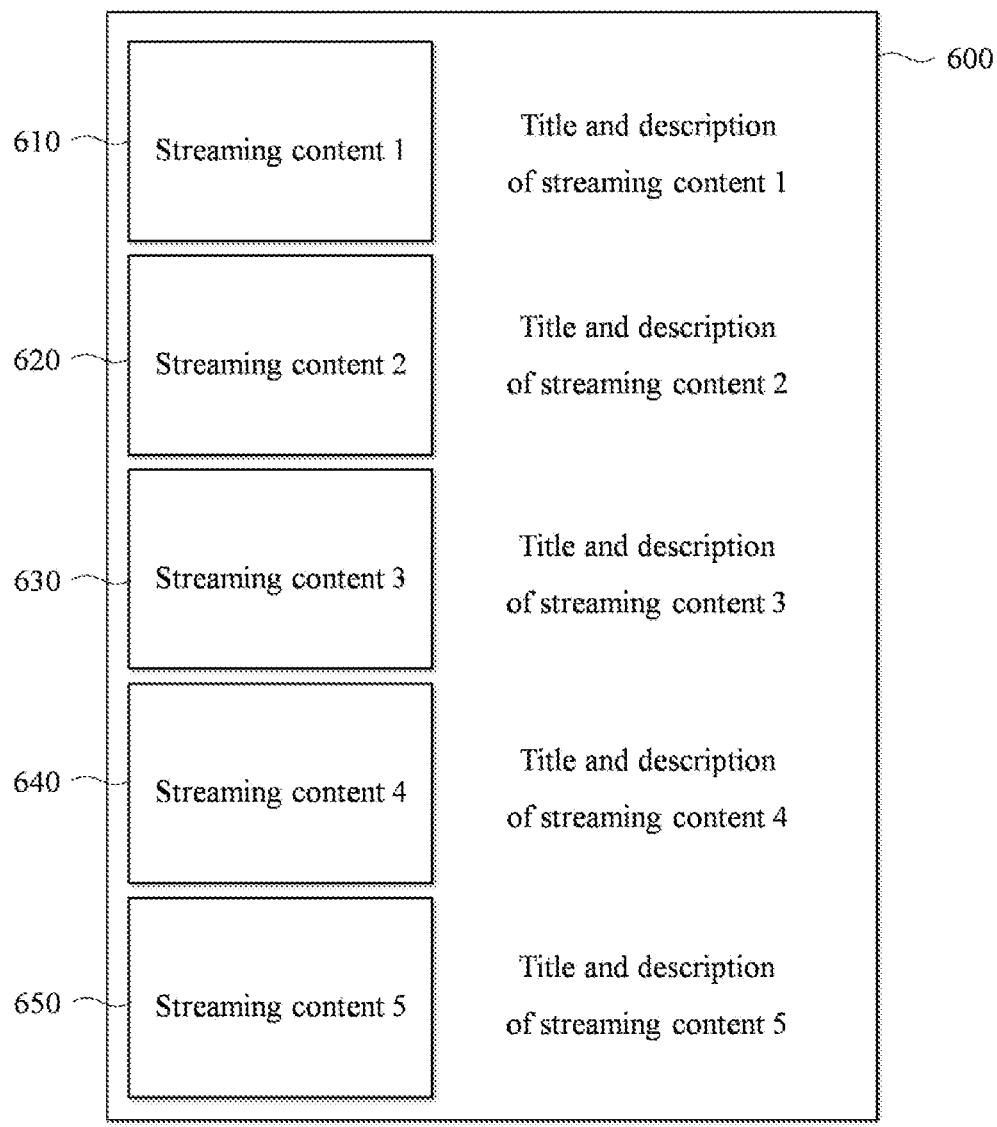
FIG. 6 is a block diagram illustrating an example of a preloading and caching order in a content listview in an embodiment of the present disclosure.

FIG. 6 is a diagram illustrating an example of a preloading and caching order in a content listview in an embodiment of the present disclosure. A content listview 600 in FIG. 6 illustrates an example including streaming content 1 610 to streaming content 5 650. If a user focuses on the streaming content 1 610 (e.g., when a mouse over event occurs in an area in which the streaming content 1 610 is displayed in a PC environment), the streaming content 1 610 may be played back. At this time, the local proxy server 430 may preload and cache data (e.g., a manifest file and track information) of the streaming content 2 620 disposed relatively closely to the streaming content 1 610 that is focused and played back, and may then preload and cache data in order of the streaming content 3 630, the streaming content 4 640, and the streaming content 5 650. If the user focuses on the streaming content 3 610, the local proxy server 430 may first preload and cache the streaming content 2 620 and the streaming content 4 640 disposed relatively closely to the streaming content 3 610, and may then preload and cache the streaming content 1 610 and the streaming content 5 650.

Furthermore, the local proxy server 430 may delete data from the cache based on the same criterion. For example, when deleting data from the cache, the local proxy server 430 may delete the date of streaming content disposed relatively far from streaming content that is now being played back.

Furthermore, the local proxy server 430 may adjust the priority of data so that data including a manifest file or track information is stored in the cache relatively long. For example, the local proxy server 430 may adjust the priority of data so that the first chunk including an m3u8 file of HLS or a moov file of mp4 remains in the cache longer than the remaining data. As a more detailed example, if data having a 1 mb size of a start portion of mp4 is determined to include a moov file, a caching policy by which the local proxy server 430 gives priority to the data having the 1 mb size of the start portion of mp4 so that the data remains in the cache relatively longer than other data may be set.

FIG. 7 is a flowchart illustrating an example of a method of playing back, by a client, streaming content according to an embodiment of the present disclosure. The method of playing back streaming content according to the present embodiment may be performed by the computer device 200 that implements the client of a streaming service. In this case, the processor 220 of the computer device 200 may be implemented to execute a control instruction according to a code of an operating system or a code of at least one program included in the memory 210. In this case, the processor 220 may control the computer device 200 to execute steps 710 to 750 included in the method of FIG. 7 in response to the control instruction provided by the code stored in the computer device 200.

In step 710, the computer device 200 may set an initial bit rate for a player module that plays back streaming content. For example, the processor 220 may set the initial bit rate for the player module that plays back the streaming content under the control of a code that is generated by a computer program installed and driven in the computer device 200 and that corresponds to a streaming player client. In this case, the initial bit rate for the player module may be set by considering a network bandwidth, the amount of buffer remaining, a screen size, etc.

In step 720, the computer device 200 may deliver, to a streaming server, a request for a manifest file of the streaming content from the player module. For example, the processor 220 may receive the request for the manifest file from the player module under the control of the code corresponding to the streaming player client, and may deliver the request to the streaming server over the network 170. In this case, the streaming server may transmit the manifest file to the computer device 200.

In step 730, the computer device 200 may edit the manifest file received from the streaming server based on the set initial bit rate. For example, the processor 220 may edit the manifest file under the control of a code that is generated by a computer program installed and driven in the computer device 200 and that corresponds to a local proxy server.

At this time, the computer device 200 may select one of the tracks recorded on the manifest file based on the set initial bit rate. For example, the computer device 200 may select a track most suitable for the set initial bit rate by comparing the set initial bit rate with each of the tracks recorded on the manifest file. Thereafter, the computer device 200 may edit the manifest file so that the selected track is recorded as the first track of the manifest file.

In step 740, the computer device 200 may deliver the edited manifest file to the player module through the streaming player client. In this case, as the player module selects the first track in the edited manifest file, the selected track may be selected based on the set initial bit rate.

Thereafter, the player module may request track information of the first track as in the existing process, and may request the first fragment file of the first track. Accordingly, the computer device 200 may deliver, to the streaming server, the request for the track information of the track selected in the edited manifest file from the player module. The computer device 200 may deliver, to the player module, the track information delivered from the streaming server. Furthermore, thereafter, the computer device 200 may deliver, to the streaming server, the request for the first fragment file from the player module. The computer device 200 may deliver, to the player module, the first fragment file delivered from the streaming server. Through such a process, the player module may play back the corresponding streaming content.

In step 750, while the streaming content is played back in the player module, the computer device 200 may preload and cache data of other pieces of streaming content in a content listview including the streaming content. An example in which data is preloaded and cached through a local proxy server has been described with reference to FIG. 5. In this case, the computer device 200 may determine at least one of the preloading order and caching order of each of other pieces of streaming content based on the relative distance between a location where the streaming content is disposed in the content listview and a location where each of the pieces of streaming content is disposed in the content listview. For example, the computer device 200 may preload and cache data in order from another piece of streaming content relatively closer to streaming content that is now being played back to another piece of streaming content relatively far from the streaming content that is now being played back.

As described above, according to embodiments of the present disclosure, a problem in that an adaptive track has to be selected again can be solved by setting an initial bit rate between a player module and a streaming player client and selecting a track optimized for the initial bit rate as the first track by using a local streaming server (e.g., a local proxy server) in streaming services, such as HLS, MPEG-DASH, and mp4. Furthermore, a hitting probability for cached data can be increased because a caching order of another piece of streaming content is determined based on the arrangement of streaming content that is now being focused and played back in a content listview among multiple pieces of streaming content included in the content listview by using a local streaming server.

The aforementioned system or device may be implemented as a hardware component or a combination of a hardware component and a software component. For example, the device and component described in the embodiments may be implemented using a processing device such as a processor, a controller, an arithmetic logic unit (ALU), a digital signal processor, a microcomputer, a field programmable gate array (FPGA), a programmable logic unit (PLU), a microprocessor or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, a computer storage medium or a device in order to be interpreted by the processor or to provide an instruction or data to the processing device. The software may be distributed to computer systems connected over a network and may be stored or executed in a distributed manner. The software and the data may be stored in one or more computer-readable recording media.

The method according to embodiments may be implemented in the form of a program instruction executable by various computer means and stored in a computer-readable medium. The computer-readable medium may include a program instruction, a data file, and a data structure solely or in combination. The medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as a CD-ROM and a DVD, magneto-optical media such as a floptical disk, a ROM, a RAM, and a flash memory. Furthermore, other examples of the medium may include an app store in which apps are distributed, a site in which other various pieces of software are supplied or distributed, and recording media and/or storage media managed in a server. Examples of the program instruction include a high-level language code executable by a computer by using an interpreter in addition to a machine-language code, such as that written by a compiler.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

Accordingly, other implementations, other embodiments, and the equivalents of the claims fall within the scope of the claims.

The invention claimed is:

1. A non-transitory computer-readable recording medium storing a computer program for enabling a computer device to execute a method of playing back streaming content, the method comprising:
setting, by a streaming player client, an initial bit rate for a player module which plays back streaming content;
delivering, by the streaming player client, a request for a manifest file of the streaming content from the player module to a streaming server;
editing, by a local proxy server, the manifest file delivered from the streaming server based on the set initial bit rate;
delivering, by the local proxy server, the edited manifest file to the player module through the streaming player client; and
preloading and caching, by the local proxy server, data of other pieces of streaming content in a content listview including the streaming content, while the streaming content is played back in the player module.

2. The recording medium of claim 1, wherein the editing of the manifest file comprises:
selecting one track among tracks recorded on the manifest file based on the set initial bit rate; and
recording the selected track as a first track of the manifest file.

3. The recording medium of claim 2, wherein the track selected based on the set initial bit rate, is selected by the player module as the player module selects the first track in the edited manifest file.

4. The recording medium of claim 1, wherein the method of playing back streaming content further comprises:

delivering, by the streaming player client, a request for track information of the track selected in the edited manifest file from the player module to the streaming server; and delivering, by the streaming player client, the track information delivered from the streaming server to the player module.

5. The recording medium of claim 1, wherein the preloading and caching comprises determining at least one of a preloading order and caching order of each of the other pieces of streaming content, based on a relative distance between a location where the streaming content is disposed and a location where each of the other pieces of streaming content is disposed in the content listview.

6. A method of playing back streaming content by a computer device including at least one processor, the method comprising:

setting, by the at least one processor, an initial bit rate for a player module which plays back streaming content;

delivering, by the at least one processor, a request for a manifest file of the streaming content from the player module to a streaming server;

editing, by the at least one processor, the manifest file delivered from the streaming server based on the set initial bit rate;

delivering, by the at least one processor, the edited manifest file to the player module; and preloading and caching, by the at least one processor, data of other pieces of streaming content in a content listview including the streaming content, while the streaming content is played back in the player module.

7. The method of claim 6, wherein the editing of the manifest file comprises:

selecting one track among tracks recorded on the manifest file based on the set initial bit rate; and recording the selected track as a first track of the manifest file.

8. The method of claim 6, further comprises:

delivering, by the at least one processor, a request for track information of the track selected in the edited manifest file from the player module to the streaming server; and delivering, by the at least one processor, the track information delivered from the streaming server to the player module.

9. The method of claim 6, wherein the preloading and caching comprises determining at least one of a preloading order and caching order of each of the other pieces of streaming content, based on a relative distance between a location where the streaming content is disposed and a location where each of the other pieces of streaming content is disposed in the content listview.

10. A computer device for executing a method of playing back streaming content, comprising:

at least one processor;

a memory for storing a program for enabling the processor to perform the functions including, setting an initial bit rate for a player module which plays back streaming content, delivering a request for a manifest file of the streaming content from the player module to a streaming server, editing the manifest file delivered from the streaming server based on the set initial bit rate, delivering the edited manifest file to the player module, and preloading and caching data of other pieces of streaming content in a content listview including the streaming content, while the streaming content is played back in the player module.

11. The computer device of claim 10, wherein the at least one processor selects one track among tracks recorded on the manifest file based on the set initial bit rate, and records the selected track as a first track of the manifest file.

* * * * *